(12) United States Patent
Lee

(10) Patent No.: US 7,266,905 B1
(45) Date of Patent: Sep. 11, 2007

(54) STRUCTURE FOR THE HEAD OF MEASURING TAPE

(76) Inventor: Shih-Lin Lee, No. 22, Lane 81, Sec. 2, Tunbwa S Rd., Taipei (TW)

( * ) Notice: Subject to any disclaimer, the term of this patent is extended or adjusted under 35 U.S.C. 154(b) by 0 days.

(21) Appl. No.: 11/468,188

(22) Filed: Aug. 29, 2006

(51) Int. Cl.
  *G01B 3/10* (2006.01)
(52) U.S. Cl. .............................. 33/758; 33/768; 33/770
(58) Field of Classification Search .......... 33/758–760, 33/768, 770
  See application file for complete search history.

(56) References Cited

U.S. PATENT DOCUMENTS

| 5,425,181 A | * | 6/1995 | Calvert ........................ 33/770 |
| D438,130 S | * | 2/2001 | Modisett ...................... D10/74 |
| 6,510,622 B2 | * | 1/2003 | Laughlin et al. .............. 33/770 |

* cited by examiner

*Primary Examiner*—Yaritza Guadalupe-McCall

(57) ABSTRACT

A structure of head for the measuring tapes includes a moving part pivoted on a tape hook of the tape head, such that the moving part can overturn upwards and downwards on the tape hook and has the front portion thereof pivoting a wheel, wherein the wheel contacts with the object to measure or other contact areas as the tape is to be output and the output of the tape is facilitated through the rotation of the wheel.

16 Claims, 7 Drawing Sheets

STRUCTURE FOR THE HEAD OF MEASURING TAPE

BACKGROUND OF THE INVENTION

1. Field of the Invention

The present invention relates to an improved structure of a head for a measuring tape and, particularly, to an improved structure of a head for a measuring tape that has a wheel pivoted on the tape hook of the tape, for facilitating the output of the tape through the rotation of the wheel.

2. Description of Related Art

Nowadays utilization of the measuring tape is very frequent. Especially, the cost for labor in the present days runs so high that DIY (do it yourself) becomes a greatly popular fashion; for instance, the measuring tape is used often for measuring sizes for house repairing or furniture making in daily life. The measuring tape is even indispensable implements for stuffs in situ; for instance, survey or estimation can proceeds with the measuring tape or, otherwise, such work as change or modification requires use of the measuring tape. Therefore, there is no need to doubt the practicability of the measuring tape.

To have more precise measurement with the measuring tape, conventional measuring tapes have the head of the tape combining with a tape hook, which grapples an end portion of the object to measure and thus enables knowing the size of the object. However, although the size of the object to measure can be acquired with hooking, the tape hook is fastened to the head and is not allowed to overturn and move, resulting in unsmooth output of the tape as the tape hook contacts with the object.

Accordingly, the conventional measuring tapes described above still have a great deal of drawbacks and require an improvement.

The inventor of the application has endeavored to innovate in view of the various shortcomings derived from the aforesaid conventional measuring tapes and, eventually, developed the present i improved structure of head successfully through years of exhausting research.

SUMMARY OF THE INVENTION

The present invention is to provide an improved structure of head for the measuring tape that may automatically output the tape in a continuously way; actually the present invention is to provide an improved structure of head for the measuring tape that has a wheel pivoted on the tape hook of the head for smooth output of the tape through the contact of the wheel with the object to measure.

The present invention is to provide an improved structure of head for the measuring tape having advantages such as simple structure, easy assembling and convenient operation.

An improved structure of head for the measuring tape capable of fulfilling the purpose described above comprises a tape and a moving part, wherein the tape is to be rolled up and contained in a cashing of the measuring tape and has the head thereof combing with a tape hook, and the moving part has a front portion thereof pivoting a wheel and has a back portion thereof pivoting with the tape hook, for allowing the moving part to overturn upwards and downwards on the tape hook and thus the wheel to be positioned in front of, over or under the tape hook, depending on the measuring angle, so that the wheel always contacts with the object to measure as measurement with the measuring tape proceeds which has the output of the tape facilitated through the rotation of the wheel and starts with the measurement upon the output of the tape arriving at a fixed point.

These features and advantages of the present invention will be fully understood and appreciated from the following detailed description of the accompanying Drawings.

DETAILED DESCRIPTION OF THE EMBODIMENTS

Figure 1A:
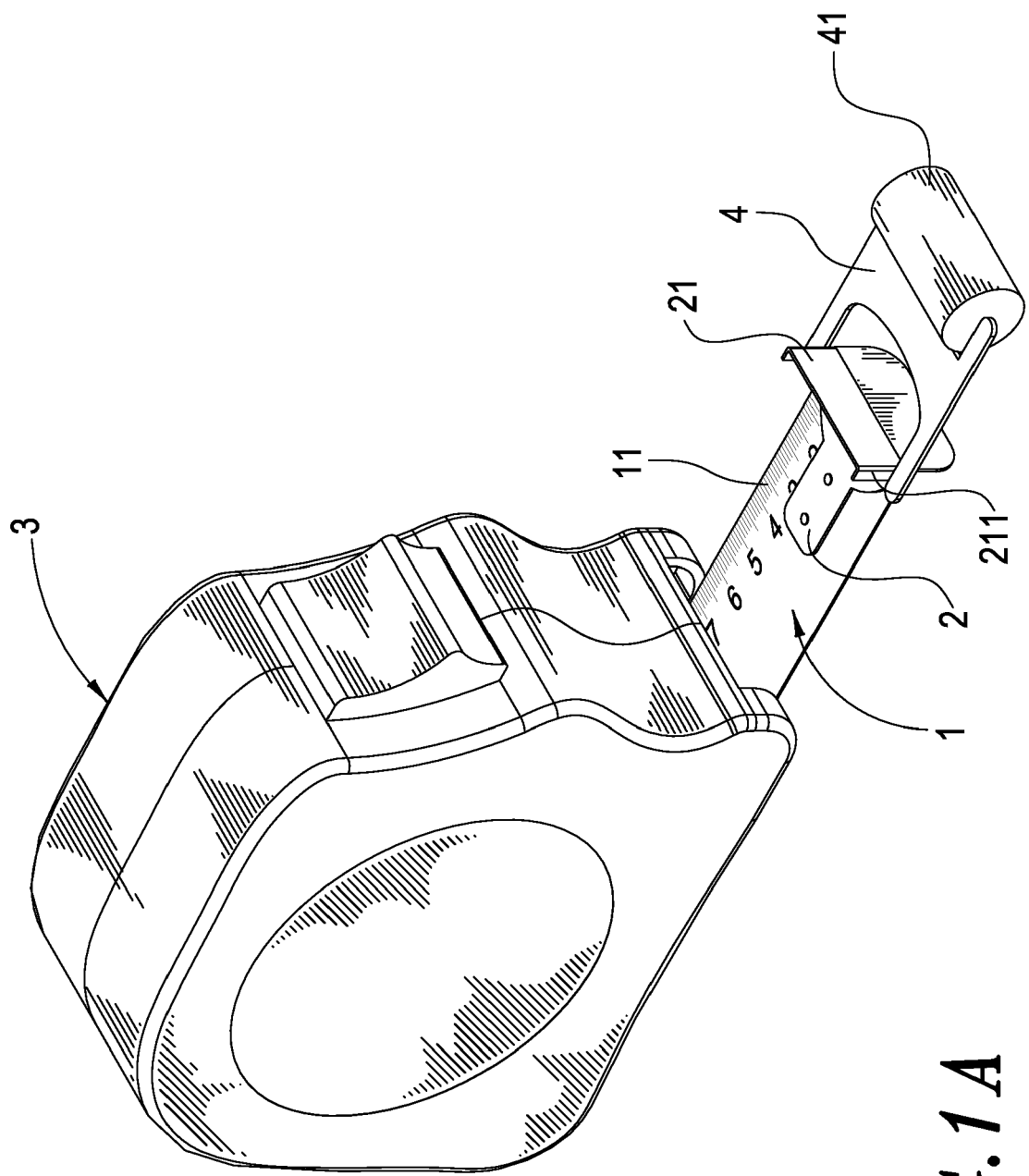
FIGS. 1A, B and C are stereo schematic diagrams of the improved structure of head for the measuring tape according to the present invention.
Figure 1B:
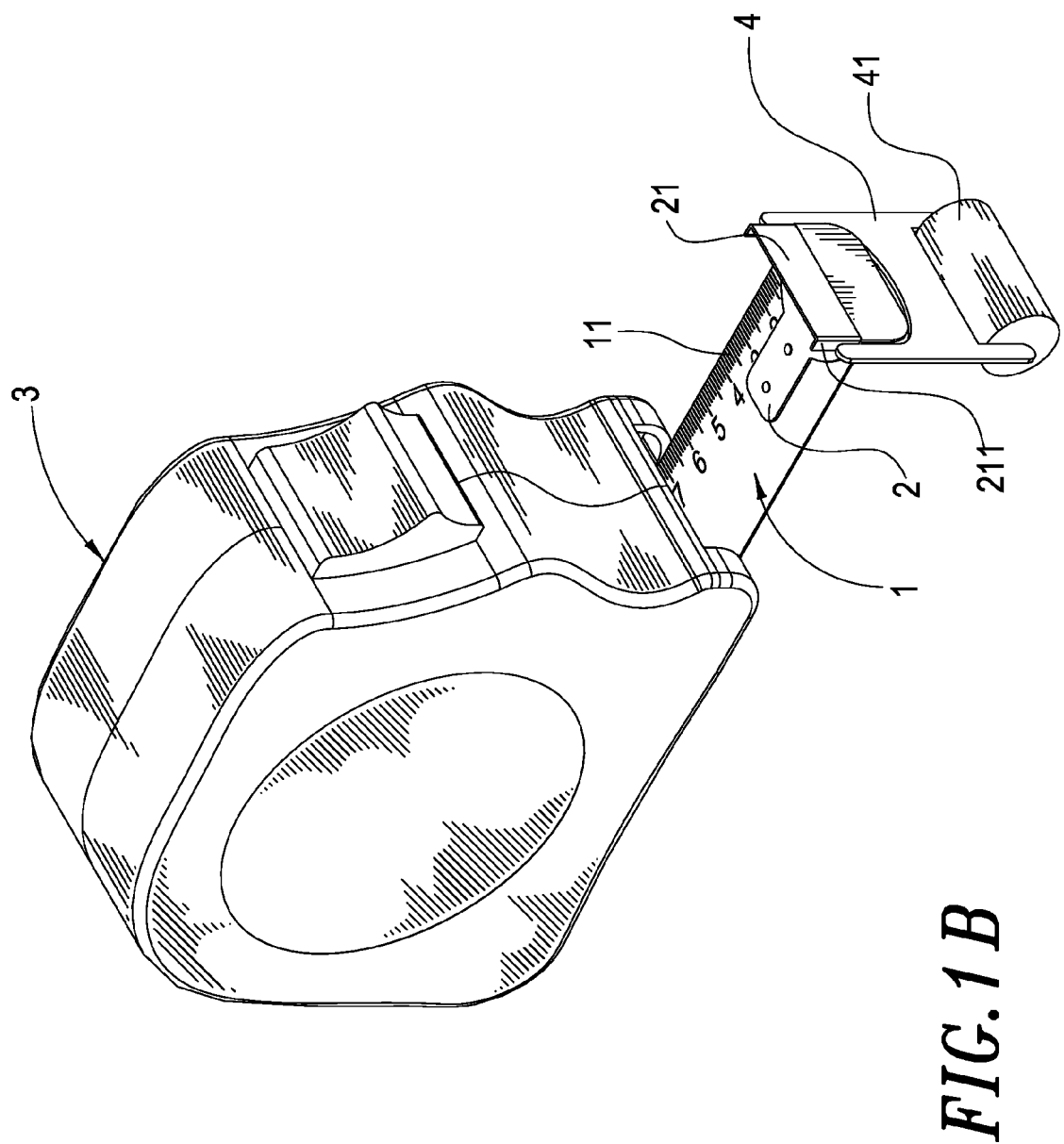
Figure 1C:
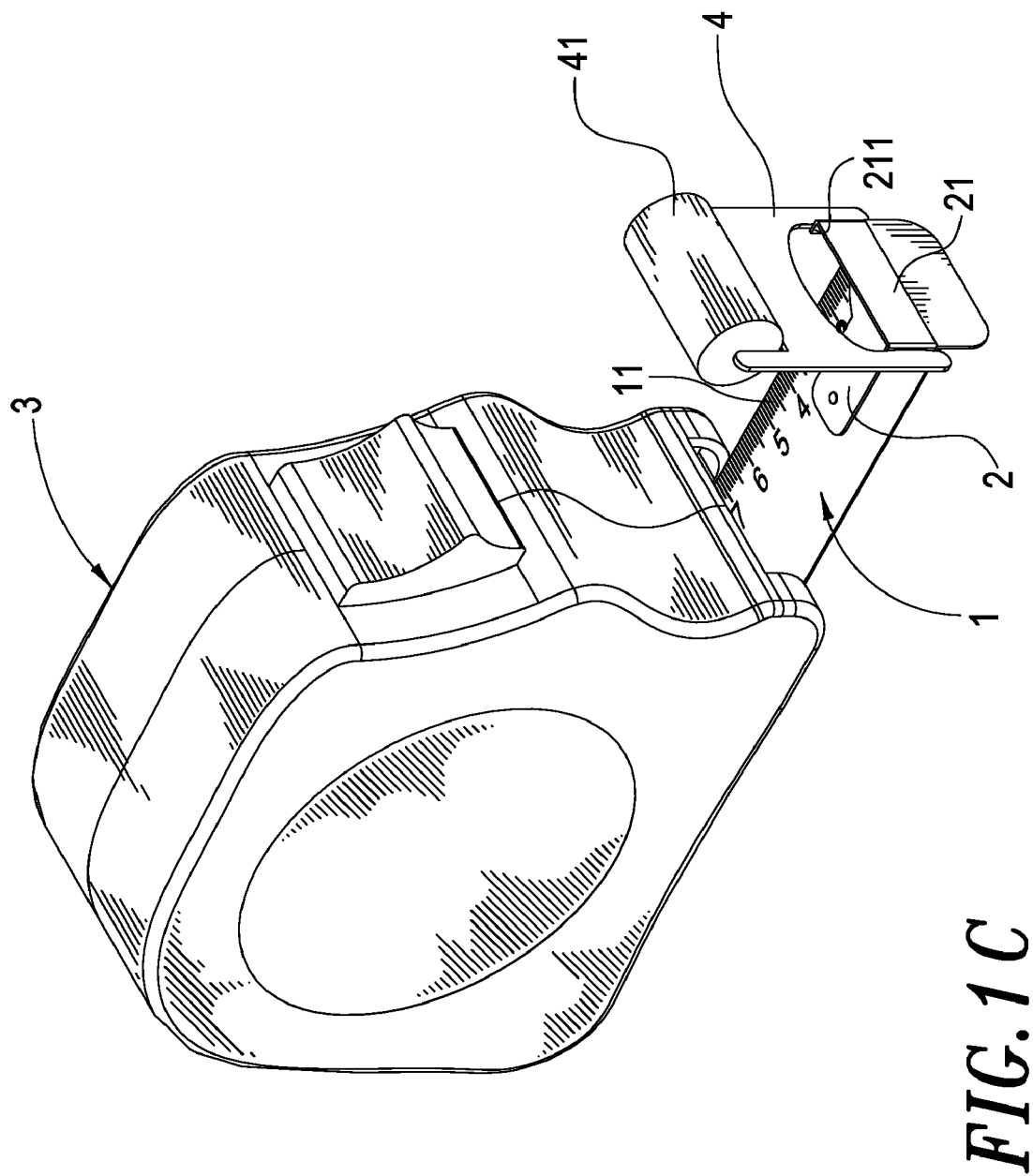

Referring to FIGS. 1A, B and C, the improved structure of head for the measuring tape according to the present invention mainly comprises a tape 1 and a moving part 4.

The tape 1 has a scale 11 marked on the surface thereof and combines with a tape hook 2, comprising a hook body 21 of the tape hook 2, at the head thereof. The tape 1 is to be rolled up and contained in a cashing 3 of the measuring tape and the tape hook 2 is excluded from the cashing 3 of the measuring tape through the retaining of the hook body 21 of the tape hook 2 so that the tape 1 may be pulled for output by the user through the tape hook 2, and further the hook body 21 of the tape hook 2 is allowed to be disposed either under or over the head of the tape 1 or disposed both under and over the head.

The moving part has a front portion pivoting a wheel 41 and has a back portion pivoting with the tape hook 2, for allowing the moving part 4 to overturn upwards and downwards on the tape hook 2 with an overturning angle between 0° and 180° and thus the wheel 41 to be positioned in front of, over or under the tape hook 2, depending on the measuring angle (as shown in FIGS. 1A, B and C).

Further, the hook body 21 of the tape hook 2 has both side edges thereof bent outwards for forming two corresponding pivoting pieces 211, the pivoting pieces 211 allowing for pivoting the back portion of the moving part 4.

Further, the moving part 4 may be made to be approximately H-shaped, for allowing the front portion thereof to pivot the wheel 41 and the back portion thereof to pivot with the tape hook 2.

Further, the moving part 4 may be two corresponding pivots (not shown), the two corresponding pivots having front portions pivoting the wheel 41 and back portions pivoting with the tape hook 2.

Figure 2A:
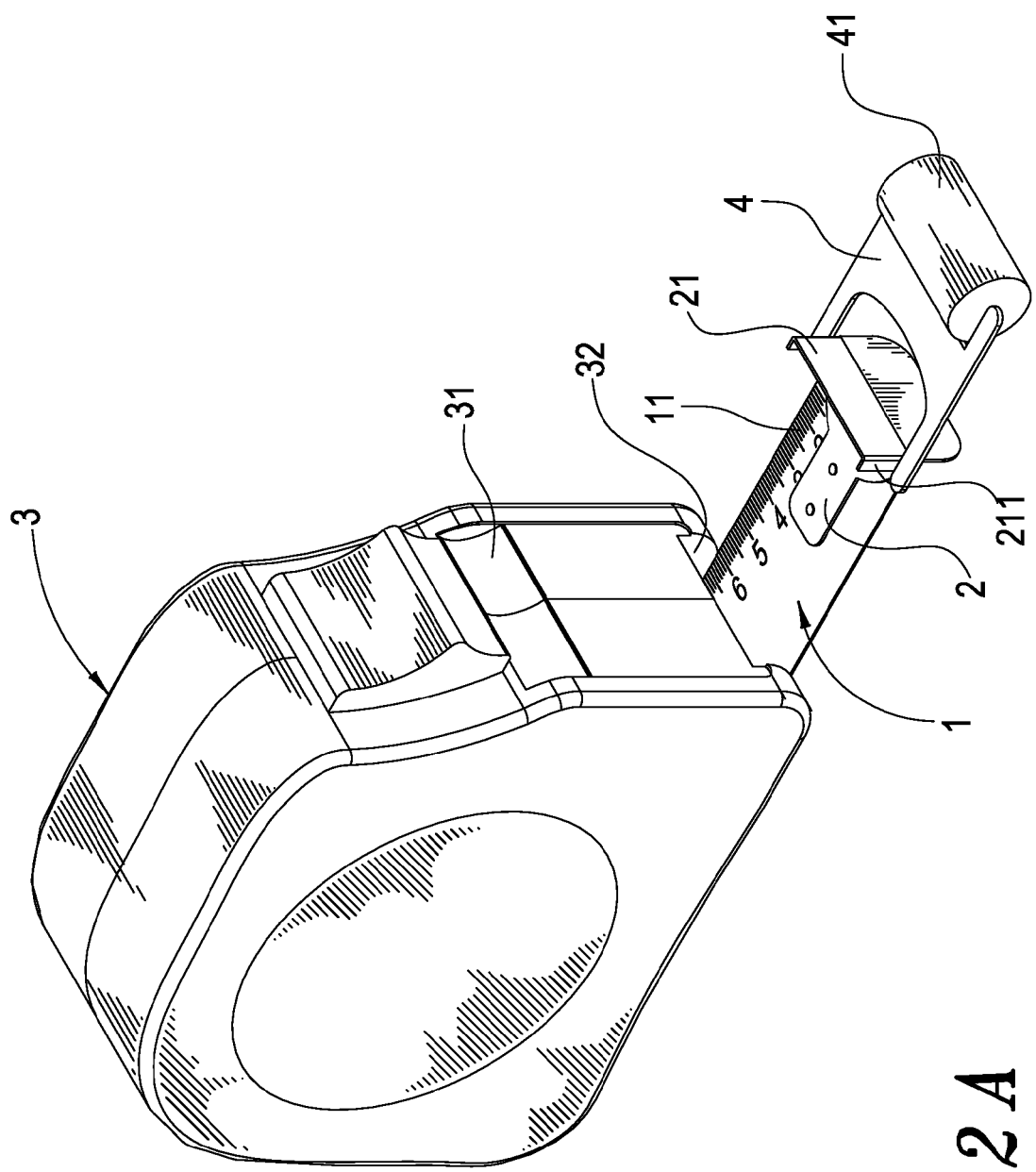
FIGS. 2A and B are another deployment schematic diagrams of the improved structure of head for the measuring tape according to the present invention.
Figure 2B:
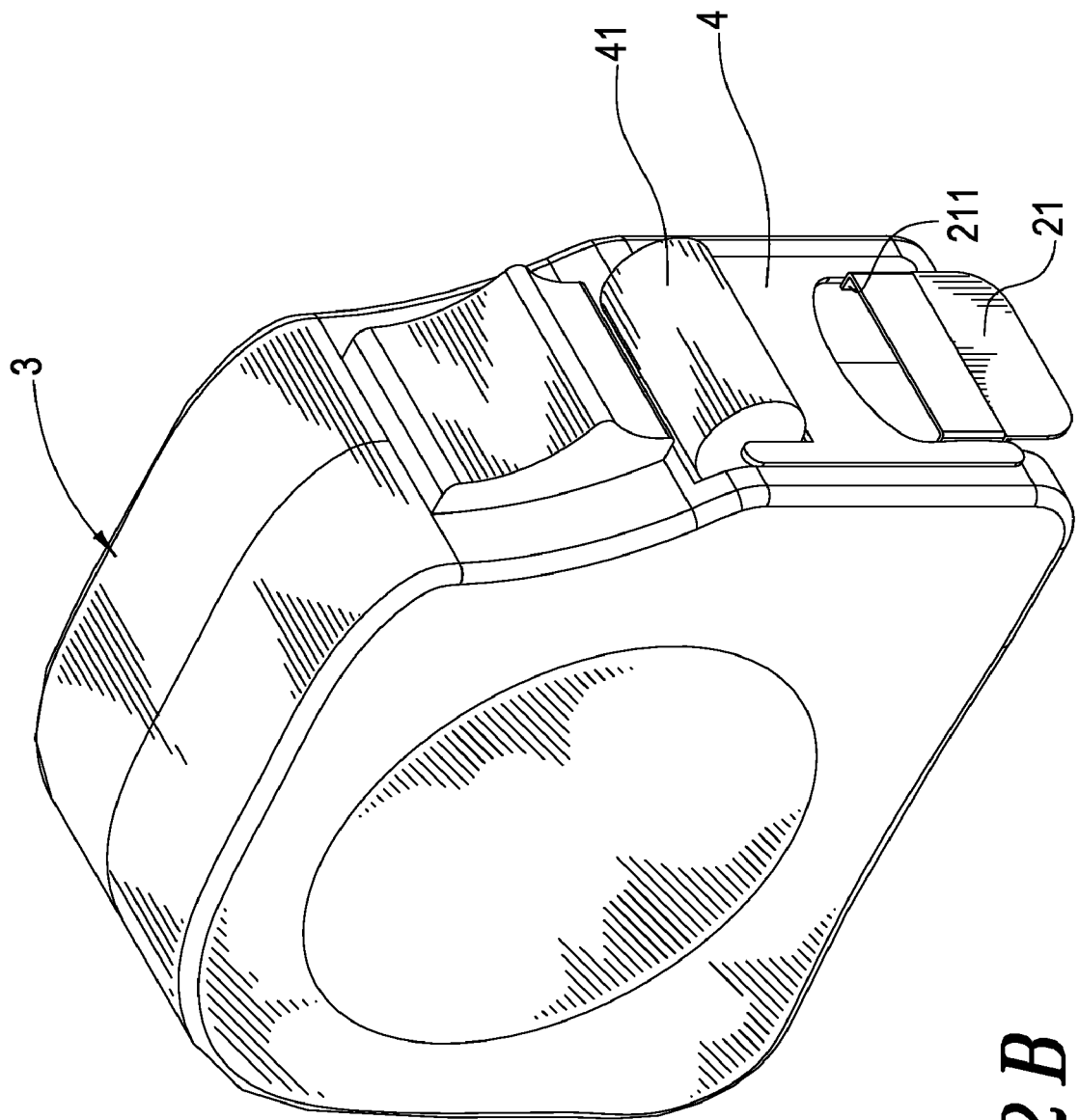

Still referring to FIGS. 2A and B, which are another deployment schematic diagrams of the present invention, wherein the tape and the moving part have structures the same as shown in FIGS. 1A, B and C and thus not to be given more details herein, whereas the difference lies in a positioning trough 31 disposed over a tape outlet 32 of the cashing 3 of the measuring tape, so that the wheel 41 at the front portion of the moving part 4 may be allowed to be positioned in the positioning trough 31 for containing and positioning the wheel 41 when the tape 1 is rolled up and contained in the cashing 3.

Figure 3A:
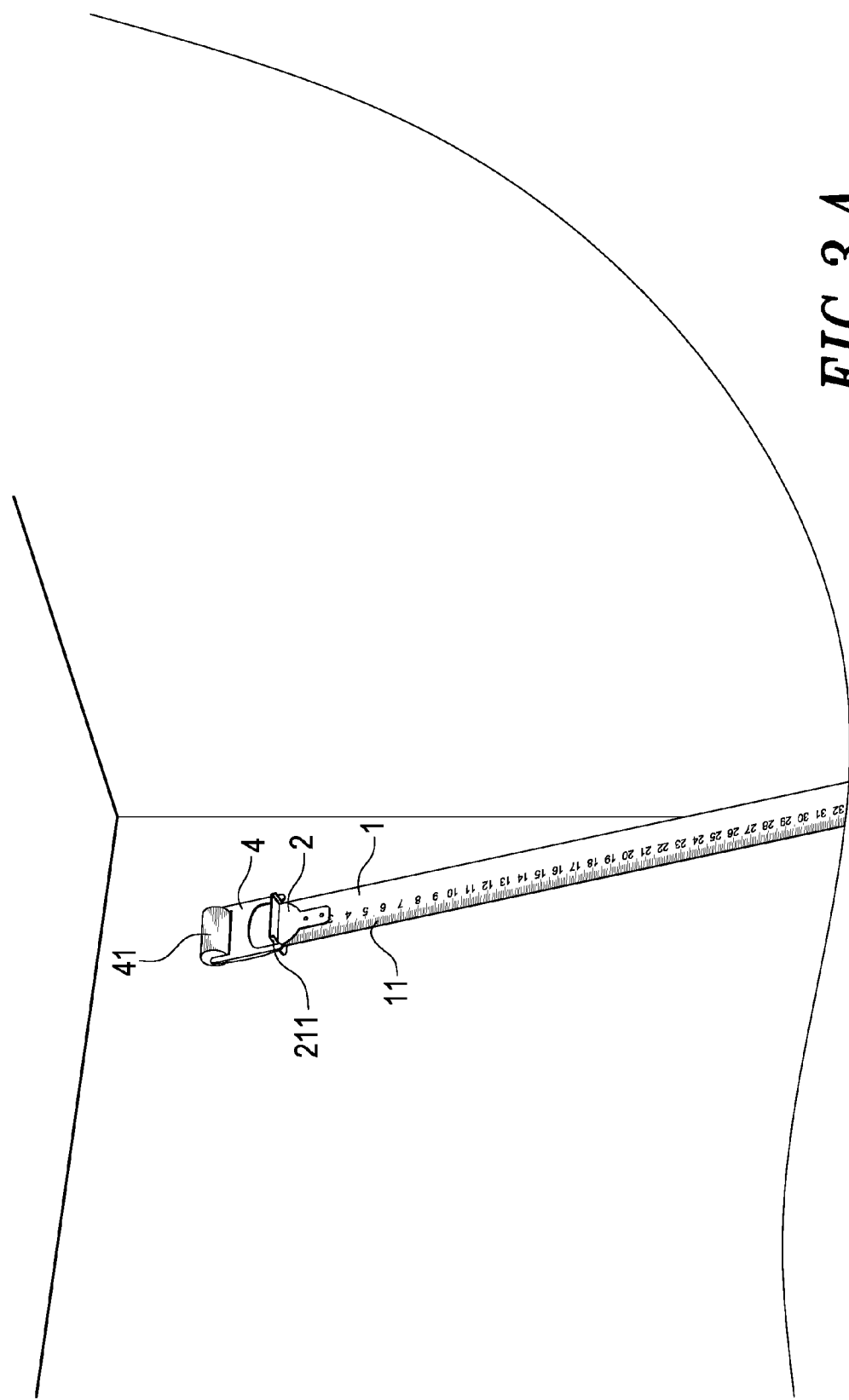
FIGS. 3A and B are operation schematic diagrams of the improved structure of head for the measuring tape.
Figure 3B:
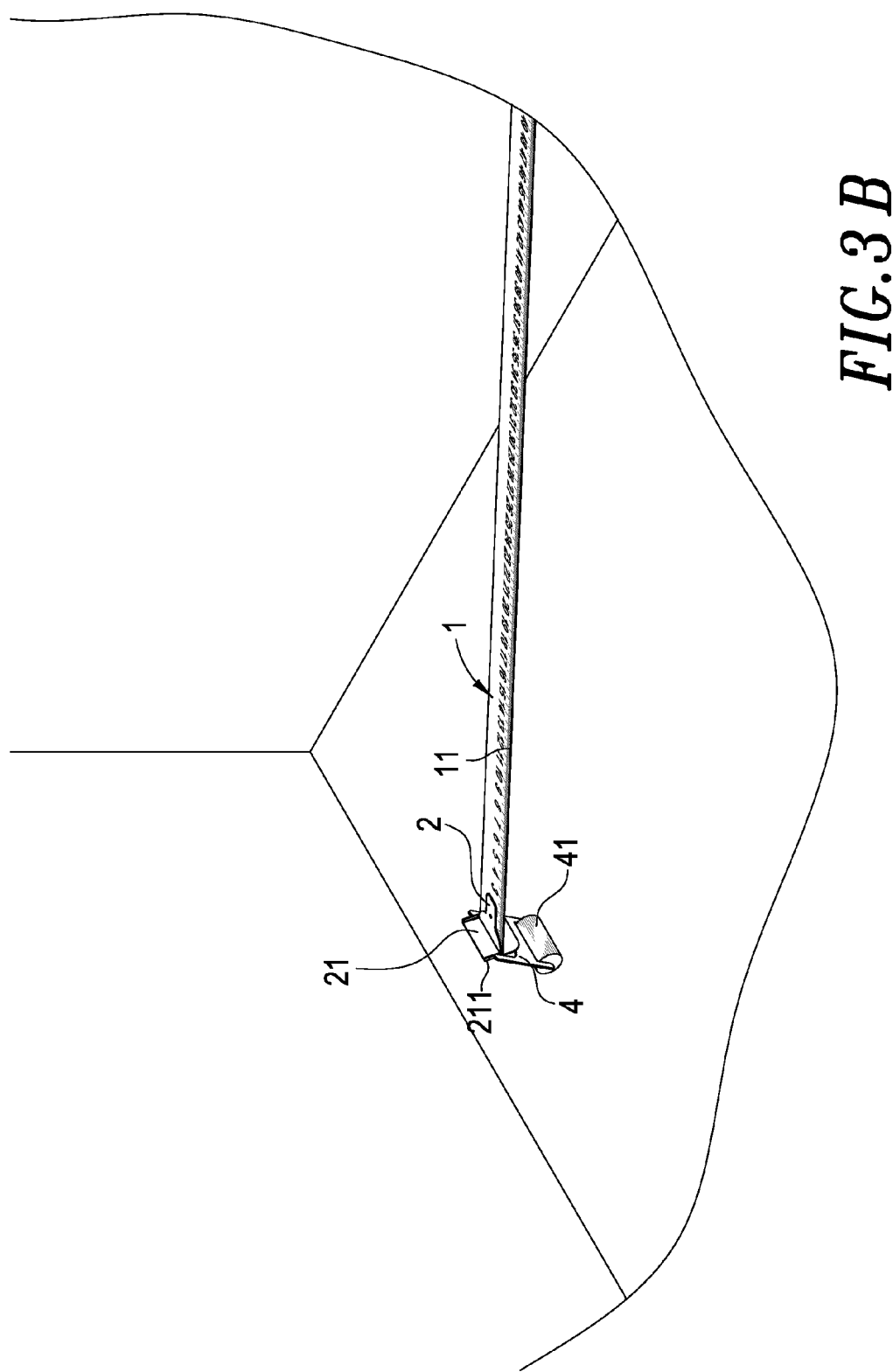

Still further referring to FIGS. 3A and B, which are operation schematic diagrams of the present invention, wherein the head of the tape 1 is to be output at first when the user intends to measure the sizes of an object to measure, so that the wheel always contacts with the object or other contact areas (e.g., the ground or a wall) regardless of the measuring angle and the tape 1 may be output smoothly through the rotation of the wheel 41 for starting with the measurement with the tape hook 2 upon the output of the tape 1 arriving at a fixed point.

Further, the moving part 4 may be a fixture part, the fixture part having similarly one end pivoting a wheel 41 and the other end fixed with a tape hook 2, so that the fixture part is not allowed to overturn on the tape hook 2, whereas other parts are the same as shown in FIGS. 1A and B and thus not to be given more details herein.

The improved structure of head for the measuring tape provided by the present invention has still the following advantages, as compared with other conventional techniques:

1. The present invention has the tape hook of the tape head pivoting a wheel that may overturn upwards and downwards, so that the tape may be output smoothly through the contact of the wheel with the object to measure or other contact areas.

2. The present invention has advantages such as simple structure, easy assembling and convenient operation and also is characterized in high practicability.

Many changes and modifications in the above-described embodiment of the invention can, of course, be carried out without departing from the scope thereof. Accordingly, to promote the progress in science and the useful arts, the invention is disclosed and is intentionally limited only by the scope of the appended claims.

What is claimed is:

1. A structure of a head for the measuring tapes, comprising:
    a tape, having a scale marked on the surface thereof and combining with a tape hook, comprising a hook body, at the head thereof; and
    a moving part, having a front portion pivoting a wheel and having a back portion pivoting with the tape hook, for allowing the moving part to overturn upwards and downwards on the tape hook,
    wherein the hook body of the tape hook has both side edges thereof bent outwards for forming two corresponding pivoting pieces, the pivoting pieces allowing for pivoting the back portion of the moving part.

2. The structure of claim 1, wherein the hook body of the tape hook is allowed to be disposed either over or under the head of the tape.

3. The structure of claim 1, wherein the hook body of the tape hook is allowed to be disposed both under and over the head.

4. The structure of claim 1, wherein the moving part is made to be approximately H-shaped, for allowing the front portion thereof to pivot the wheel and the back portion thereof to pivot with the tape hook.

5. The structure claim 1, wherein the moving part is two corresponding pivots, the two corresponding pivots having front portions pivoting the wheel and back portions pivoting with the tape hook.

6. A structure of a head for the measuring tapes, comprising:
    a tape, having a scale marked on the surface thereof and combining with a tape hook, comprising a hook body, at the head thereof;
    a positioning trough disposed over a tape outlet of the cashing of the measuring tape; and
    a moving part, having a front portion pivoting a wheel and having a back portion pivoting with the tape hook, for allowing the moving part to overturn upwards and downwards on the tape hook and the wheel to be positioned in the positioning trough.

7. The structure of claim 6, wherein the hook body of the tape hook is allowed to be disposed either over or under the head of the tape.

8. The structure of claim 6, wherein the hook body of the tape hook is allowed to be disposed both under and over the head.

9. The structure of claim 6, wherein the hook body of the tape hook has both side edges thereof bent outwards for forming two corresponding pivoting pieces, the pivoting pieces allowing for pivoting the back portion of the moving part.

10. The structure of claim 6, wherein the moving part is made to be approximately H-shaped, for allowing the front portion thereof to pivot the wheel and the back portion thereof to pivot with the tape hook.

11. The structure of claim 6, wherein the moving part is two corresponding pivots, the two corresponding pivots having front portions pivoting the wheel and back portions pivoting with the tape hook.

12. A structure of a head for the measuring tapes, comprising:
    a tape, having a scale marked on the surface thereof and combining with a tape hook, comprising a hook body, at the head thereof; and
    a fixture part, having one end pivoting a wheel and the other end fixed with a tape hook, so that the fixture part is fixed on the tape hook,
    wherein the hook body of the tape hook is allowed to be disposed both under and over the head.

13. The structure of claim 12, wherein the hook body of the tape hook is allowed to be disposed either over or under the head of the tape.

14. The structure of claim 12, wherein the hook body of the tape hook has both side edges thereof bent inwards for forming two corresponding pivoting pieces, the pivoting pieces allowing for fixing of the fixture part.

15. The structure of claim 12, further comprising a moving part made to be approximately H-shaped, for allowing the front portion thereof to pivot the wheel and the back portion thereof to be fixed with the tape hook.

16. The structure of claim 12, further comprising a moving part being two corresponding pivots, the two corresponding pivots having front portions pivoting the wheel and back portions fixed with the tape hook.

* * * * *